Figure 1:
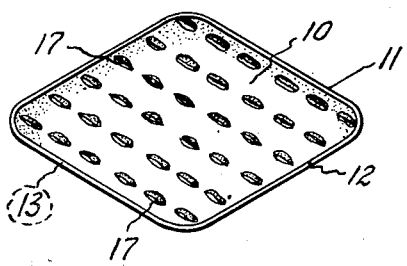

April 11, 1950     M. H. ROWE     2,503,511

VULCANIZING UNIT

Filed May 3, 1946

Marion H. Rowe
INVENTOR.

BY *Hastings Ackley*
ATTORNEY

Patented Apr. 11, 1950

2,503,511

UNITED STATES PATENT OFFICE 2,503,511

VULCANIZING UNIT

Marion H. Rowe, Dallas, Tex., assignor, by mesne assignments, to Ace Rubber Company, Dallas, Tex., a corporation of Delaware Application May 3, 1946, Serial No. 667,009

6 Claims. (Cl. 18—18)

This invention relates to new and useful improvements in fuel elements, and more particularly to fuel elements adapted for use for producing the heat necessary for vulcanizing patches of rubber or similar material to bodies of rubber or like material.

The repair of breaks or punctures in rubber articles by vulcanizing a patch of rubber to the article to completely cover and close the break or puncture has attained common use. It is also well known that individual self-contained vulcanizing units, having a piece of unvulcanized rubber or other similar material, a combination pressure plate and fuel container, and a fuel element, may be used in effecting such repairs to the rubber article. One of the more common articles so repaired is the inner tube of pneumatic tires; however, the vulcanizing unit may be used for the repair of other types of rubber articles.

In the use of vulcanizing units of the character just described, the fuel element must be ignited by application of an external source of heat. Due to the method of manufacture of the fuel elements and to the ageing and hardening of the surface of such elements, it is frequently difficult to ignite the fuel element and it is therefore very desirable that some means providing for ready ignition of the fuel element be incorporated in the fuel element.

Also, the heating elements commonly used at the present time buckle and rise off of the bottom of the pan or container in which they are placed as they burn, with the result that the heat transferred through the bottom of the pan forming the pressure plate to the vulcanizing patch is considerably reduced and the efficiency of the vulcanizing unit is impaired.

It is, therefore, one object of this invention to provide an improved fuel element arranged for ready ignition.

Another object of the invention is to provide a fuel element of the character described which is arranged to vent the gases produced by combustion of such element to permit the fuel element to remain substantially flat or in contact with the bottom of the pan or pressure plate, whereby maximum utilization of the heat produced by the burning of the fuel element is attained.

A further object of the invention is to provide an improved fuel element having a plurality of protruding ignition or lighting tips or fuses, whereby more than one fuse tip is exposed to the flame source applied to the fuel element for ignition of such element with the result that improved ignition of the fuel element is obtained.

Still another object of the invention is to provide a fuel element of the character described wherein the fuse tips are obtruded from the body of the fuel element and wherein, in the process of obtrusion of the fuse tips, vent openings are formed in said fuel element for venting gases of combustion from between the fuel element and the pressure plate or bottom of the fuel container as the fuel element is burned.

A particular object of the invention is to provide a fuel element of the character described having lighting or ignition means formed by a portion of the interior of the fuel element exposed and projecting beyond the surface thereof.

A still further object of the invention is to provide a fuel element having an integral lighting tip or fuse presenting projecting fuzzed or loosened edge portions from the interior of the body of the fuel element in a readily accessible position for application of a source of ignition.

An important object of the invention is to provide a fuel element having integral lighting tips or fuses, of the character set forth, in combination with vent openings providing for venting of the gases of combustion of the fuel element, whereby the ignition and burning of the element is facilitated and substantial buckling of the element is prevented.

Figure 5:
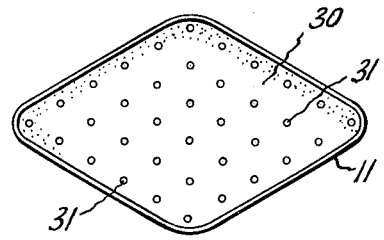
Figure 2:
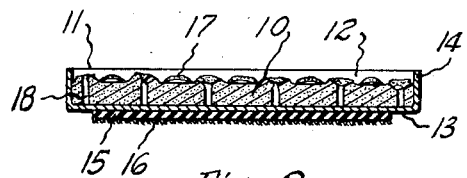
Figure 6:
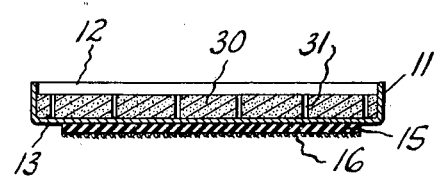
Figure 4:
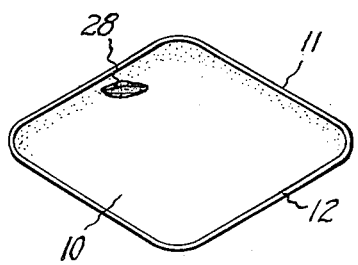
Figure 3:
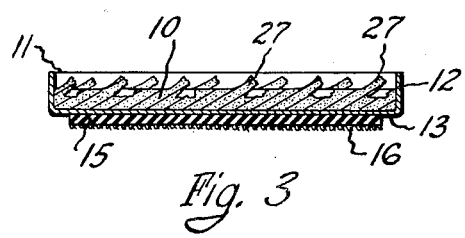

Additional objects and advantages of the invention will readily be apparent from a reading of the following description of a device constructed in accordance with the invention, and reference to the accompanying drawings thereof, wherein:

Figure 1 is a plan view of a vulcanizing patch unit having a fuel element constructed in accordance with the invention provided therein, Figure 2 is a longitudinal cross-sectional view taken along the major axis of the unit of Figure 1, Figure 3 is a longitudinal cross-sectional view, similar to Figure 2, of a vulcanizing unit having a modified form of fuel element provided therein, Figure 4 is a plan view of a vulcanizing element provided with a fuel element having a single lighting tip or fuse thereon, Figure 5 is a plan view of a vulcanizing unit having a fuel element provided with a plurality of vent openings, and Figure 6 is a longitudinal cross-sectional view taken along the major axis of the unit shown in Figure 5.

In the drawings, a fuel element 10 is illustrated as being incorporated in a vulcanizing patch unit 11 including a shallow pan or fuel container 12 of thin sheet metal having a flat bottom 13 forming a pressure plate and having continuous upstanding peripheral sides 14. The pan is illustrated as being formed in substantially a diamond shape, but may be oval, round or of any other desired shape. An unvulcanized gum rubber patch 15 of substantially the same shape as the pan 12 is mounted upon the flat under side of the pan or pressure plate and adheres thereto. The exposed lower surface of the patch is protected by a fabric cover 16 which may readily be stripped from the patch in the usual manner when the vulcanizing unit is used.

The fuel element 10 is preferably wafer or disclike and is disposed within the interior of the pan, as clearly shown in Figures 1 and 2, being of a thickness slightly less than the height of the sides of the pan. The fuel element is customarily and preferably made of a relatively porous fibre or paper board impregnated with a solution of combustible materials which is so compounded as to support complete combustion of the element in such a manner as to furnish a relatively high temperature and at the same time generate a heat lasting for a sufficient period of time to assure vulcanizing of the patch 15 to the article which is to be repaired. The composition and treating of the fuel element is well known to those skilled in the art.

It is also well known that the fuel element in common use presents a smooth somewhat calendered upper surface which is difficult to ignite. Also, with the ageing and hardening of the surface of the fuel element, it becomes increasingly difficult to ignite such smooth exposed surface of the element.

In order to provide for ready ignition of the fuel element 10, lighting tips or fuses 17 are formed on the exposed upper surface thereof. The lighting tips are formed by roughening, tearing, breaking or puncturing the fuel element in such a manner as to obtrude, or cause to project or protrude, a portion of the interior material of the fuel element in such a manner as to present or expose a loosened or fuzzy edge portion of such interior material in a position projecting from the surface of the fuel element, whereby such loosened projecting interior portion of the body material of the element is readily accessible to a source of heat or flame to provide for ready ignition thereof. Since the interior portion of the fuel wafer or disc is usually somewhat softer or less compact than the exterior surfaces thereof, and since the roughening or obtruding of the lighting tip further loosens and softens the projecting interior portion of the body of the fuel element, it will be seen that a fuzzed, loosened, relatively soft lighting tip or fuse is formed which is readily ignitable. It is very desirable that the fibres of the obtruded inner portion of the body of the fuel element not be broken off from the remainder of the interior of the body of the element. In actual practice or use, it has been found that the lighting tip formed in the foregoing manner may be ignited by placing the glowing coal of a lighted cigarette in contact with such tip, thus evidencing the improved ignition characteristic provided by such lighting tip or fuse.

The lighting tips illustrated in Figures 1 and 2 are formed by substantially perforating the disc or wafer-like fuel element 10 from the under side, forming vent openings or ports 18 through the body of the fuel element and at the same time obtruding or forcing a portion of the soft and loosened interior material of the fuel element upwardly to form the projecting lighting tip or fuse 17 and exposing such loosened, softer interior material above the surface of the fuel element. A plurality of relatively closely spaced vent openings and fuse tips are provided in this form of the invention for the purpose of assuring ignition of the fuel element when a source of flame or heat is applied to the upper surface thereof. Obviously, the closely spaced tips provide for exposing a plurality of the lighting tips or fuses to a single source of flame so that at least one of the several lighting tips so exposed to the flame will be ignited thereby, thus facilitating lighting or ignition of the fuel element. Of course, should one or more of the fuse or lighting tips be ignited by the single source of flame, a larger portion of the fuel element will start burning and assure combustion of such element. Thus, exposure of a plurality of lighting tips or fuses to the single source of flame provides for more positive ignition of the fuel element and assures combustion thereof should any one or more of the lighting tips or fuses fail to ignite or to continue to burn after ignition. Also, the provision of the plurality of relatively closely spaced lighting tips or fuses permits the fuel element to be ignited at substantially any point on its upper surface, whereby the user is assured of having a lighting tip or fuse in an accessible position regardless of the type of clamp (not shown) used for pressing the vulcanizing unit against the article to be repaired or patched.

As the fuel element is consumed by combustion, a considerable volume of gases of combustion is formed. As the interior and under portion of the fuel element burn, the gases produced by combustion are trapped within the fuel element or between the fuel element and the bottom of the pan, and in escaping the gases cause the fuel element to buckle upwardly and lift or rise off of the bottom of the pan, with the result that the fuel element is spaced from the bottom of the pan and the heat generated by the fuel element is not readily transferred through the bottom of the pan to the vulcanizing patch therebelow. The efficiency of the fuel element is therefore considerably reduced or impaired and a satisfactory vulcanizing of the patch to the article being repaired may not be obtained. The vent openings or ports 18 formed through the disc or wafer-like fuel element permit the gases formed by the combustion of the element to escape from within the element and from between the element and the bottom of the pan, whereby the buckling of the fuel element is substantially eliminated and such element is permitted to remain substantially flat or in contact with the bottom of the pan so that maximum utilization of the heat generated by the combustion of the fuel element is attained and a more perfect vulcanizing of the patch to the article being repaired is assured.

By forming the vent openings or ports in such a manner that the fuse or lighting tips 17 are formed at the upper end of each of the vent openings, a more readily obtained and more positive ignition of the fuel element is secured, since the ignited loose exposed interior portions of the fuel element are attached to and integral with the remainder of the interior portion of such element exposed at the vent openings 18, whereby the fire or light readily passes from the tip downwardly to the interior of the body of the fuel element at the vent opening to cause a more positive complete ignition of the fuel element at such point.

Obviously, the lighting tips or fuses may be formed by roughening or puncturing the upper surface of the fuel element in such a manner as to turn up a softened, loosened tab or edge portion of the interior material of the fuel element in the manner illustrated in Figure 3, wherein a plurality of loosened tabs or tips 27 are shown as projecting above the upper surface of the fuel element in such a manner as to present a protruding integral exposed portion of the soft loosened interior material of the body of the fuel element to provide such lighting tips, tabs or fuses. In this modification of the invention, the fuel element is not perforated or punched from the under side but is only roughened or fractured in such a manner that the tabs are lifted above the surface of the fuel element to expose the softer loosened edge portions of the interior material to provide for ready positive ignition of the fuel element in the same manner as in the form previously described.

It will further readily be seen that a single lighting tip or fuse may be formed upon the upper surface of the fuel element by roughening, puncturing, fracturing or otherwise obtruding a portion of the softer loosened interior material of the body of the fuel element to form a projecting integral lighting tip or fuse 28 on the surface of the fuel element, such as is shown in Figure 4 of the drawings. The use and action of this single fuse is the same as that of any one of the lighting tips or fuses previously described.

It is preferable, in all forms of the invention, that the lighting tips or fuses do not project above the upper edge of the sides of the pan, whereby the lighting tips or fuses are protected against being knocked off or flattened in the handling of the vulcanizing unit.

The lighting tips or fuses may be formed prior to cutting the large body of material from which the fuel element is made into individual fuel elements, or may be formed subsequently to division of the body of combustible material into individual fuel elements, or they may be formed simultaneously with the cutting of the individual fuel elements from the body of combustible material. The fuel elements are adapted to mass production machinery and techniques. The treated porous fibre or paper board may be fed into a machine, the lighting tips or fuses may be formed thereon, the combustible fibre or paper board may then be divided into a plurality of individual fuel elements, and the individual fuel elements may then each be inserted into a vulcanizing unit pan. Obviously, the lighting tips may be formed on the fuel element at the same time that the fuel element is divided from the large body of combustible material, or subsequently to the division of the fuel elements from the large body of combustible fibre or paper board.

A fuel element 30 is illustrated in Figures 5 and 6 as having a plurality of vent openings or ports 31 therein in relatively closely spaced relation to provide for escape of gases of combustion from within the fuel element and from between said element and the bottom of the pan or container in which the element is mounted. It is obvious that this provision of the vent openings is an important feature of the fuel element, even though no lighting tip or fuse is provided on such fuel element, since the vent openings provide for permitting the burning fuel element to remain substantially flat on the bottom of the pan or container to attain a more efficient transfer of heat from the burning fuel element to the patch being vulcanized therebelow.

From the foregoing, it will be seen that an improved fuel element has been provided which may be used for generating heat for any desired purpose, but which is particularly adapted for use as the fuel element for producing the heat necessary for vulcanizing patches of rubber or similar material to articles of rubber or the like to repair breaks or punctures therein. It will also be seen than an improved lighting tip or fuse has been provided which is formed integral with the fuel element and exposes a projecting soft loosened interior portion of the body material of the fuel element beyond the surface of said fuel element to permit ready ignition of the fuel element. It will further be seen that a plurality of such projecting lighting tips or fuses has been provided for the purpose of exposing a plurality of such lighting tips or fuses to a single source of flame or heat to facilitate and assure ignition and combustion of the fuel element. The provision of the plurality of lighting tips or fuses also permits ignition of the fuel element at substantially any point thereon.

It will also be manifest that an improved fuel element has been provided which has venting ports or openings formed therein for the purpose of venting gases of combustion from the interior and under portion of the fuel element as the same is burned, thus permitting the fuel element to lie substantially flat in the pan of the vulcanizing patch unit or other unit in which it is burned, whereby maximum utilization of the heat generated by the burning fuel element is attained. Also, by positioning the venting openings or ports adjacent or in communication with the lighting tips or fuses, a more ready and positive complete ignition of the interior portion of the fuel element is obtained.

The foregoing description of the invention is explanatory only, and changes in the details of the constructions illustrated may be made by those skilled in the art, within the scope of the appended claims, without departing from the spirit of the invention.

What I claim and desire to secure by Letters Patent is:

1. A vulcanizing unit including, a substantially rigid pan member, a body of patching material on the under side of the pan member, a fuel element of combustible material on the upper side of the pan member, and an integral projecting fuse tip provided on the upper surface of the fuel element exposing a loosened portion of the interior material of the fuel element exposed for application of a source of heat to ignite said fuel element.

2. A vulcanizing element including, a substantially rigid pan member, a body of patching material on the under side of the pan member, a fuel element of combustible material on the upper side of the pan member, and an integral projecting fuse tip provided on the upper surface of the fuel element exposing a loosened portion of the interior material of the fuel element accessible for the application of a source of heat to provide for ignition of the fuel element, said fuse tip terminating short of the plane of the upper edge of the pan member whereby said tip is protected against breaking off.

3. A vulcanizing unit including, a substantially rigid pan member, a body of patching material on the under side of the pan member, a fuel element of combustible material disposed in intimate contact throughout its extent with the upper side of the pan member, and an integral projecting fuse tip provided on the fuel element exposed for application of a source of heat to ignite said fuel element.

4. A vulcanizing unit including, a substantially rigid pan member, a body of patching material on the under side of the pan member, a fuel element of combustible material disposed in intimate contact throughout its extent with the upper side of the pan member, and an integral projecting fuse tip provided on the upper side of the fuel element exposed for application of a source of heat to ignite said fuel element.

5. A vulcanizing element including, a substantially rigid pan member, a body of patching material on the under side of the pan member, a fuel element of combustible material disposed in intimate contact throughout its extent with the upper side of the pan member, and an integral projecting fuse tip provided on the upper surface of the fuel element and exposing a loosened portion of the interior material of the fuel element accessible for the application of a source of heat to provide ignition of the fuel element.

6. A vulcanizing unit including, a pan member, a body of patching material on the under side of the pan member, a fuel element of combustible material on the upper side of the pan member, a plurality of apertures provided in the fuel element, said apertures in intimate contact with the upper side of the pan member, and an integral projecting fuse tip provided on the upper side of the fuel element and exposed for application of a source of heat to ignite said fuel element.

MARION H. ROWE.

REFERENCES CITED

The following references are of record in the file of this patent:

UNITED STATES PATENTS

| Number | Name | Date |
|---|---|---|
| 143,066 | Crumpton | Sept. 23, 1873 |
| 203,535 | Fenn | May 14, 1878 |
| 1,163,629 | Low | Dec. 7, 1915 |
| 1,209,206 | Risk | Dec. 19, 1916 |
| 1,285,078 | Fay | Nov. 19, 1918 |
| 1,958,803 | Segnitz | May 15, 1934 |